United States Patent [19]

Rieber et al.

[11] 3,847,657

[45] Nov. 12, 1974

[54] HYDROPHOBIC AND OLEOPHOBIC FINISH

[75] Inventors: Martin Rieber, Schonberg, Taunus; Wilhelm Loffler, Kelkheim, Taunus, both of Germany

[73] Assignee: Farbwerke Hoechst Atkiengesellschaft vormals Meister Lucius & Bruning, Frankfurt/Main, Germany

[22] Filed: Oct. 17, 1972

[21] Appl. No.: 298,457

[30] Foreign Application Priority Data
Oct. 18, 1971 Germany.............................. 2151755

[52] U.S. Cl................. 117/135.5, 8/115.5, 8/115.6, 117/138.8 F, 260/873
[51] Int. Cl............................................ D06m 15/38
[58] Field of Search .................. 117/135.5, 138.8 F; 8/115.5, DIG. 18, 115.6; 260/873

[56] References Cited

UNITED STATES PATENTS

| | | | |
|---|---|---|---|
| 3,479,214 | 11/1969 | Pittman et al. .............. | 117/135.5 X |
| 3,617,355 | 11/1971 | Loffler et al................. | 117/135.5 X |
| 3,464,947 | 9/1969 | Mundie et al................... | 260/873 X |
| 3,412,175 | 11/1968 | Magat et al..................... | 260/873 X |
| 3,034,925 | 5/1962 | DeMarco et al............. | 117/135.5 X |
| 3,592,686 | 9/1971 | Barber et al. ................ | 117/138.8 X |
| 2,642,416 | 6/1953 | Ahlbrecht et al.................. | 260/83.5 |
| 3,274,294 | 9/1966 | Stanton et al...................... | 260/873 |

*Primary Examiner*—Herbert B. Guynn
*Attorney, Agent, or Firm*—Curtis, Morris & Safford

[57] ABSTRACT

Polyester materials are rendered hydrophobic and oleophobic by contacting said material with fluoroalkyl-acrylates or methacrylates and by effecting polymerization, graft-polymerization or both of these reactions in the presence of tetrachlorethane.

19 Claims, No Drawings

HYDROPHOBIC AND OLEOPHOBIC FINISH

The present invention relates to a process for providing polyester textiles and other polyester fibrous materials with a hydrophobic and oleophobic finish. In particular, the present invention relates to the application of monomer fluoroalkyl acrylates or methacrylates onto polyethylene glycol terephthalate fibrous materials.

Processes for applying homo- or co-polymers of perfluoroalkyl acrylates are known (cf. U.S. Pat. Nos. 2,642,416 and 2,628,958). Although these treatments give finishes which render the material oleophobic and at the same time hydrophobic, the finishes so produced have a poor resistance to washing and dry cleaning. Furthermore, processes have been described in which, in order to improve the resistance to washing and to dry cleaning, cross-linking plastic materials are applied (cf. DTAS 1 047 431 and 1 419 505).

DTAS 1 543 406 describes the use of branched chain perfluoroalkyl-vinyl and -allyl ethers for producing hydrophobic and oleophobic finishes on textile materials, wherein the vinyl or allyl ethers are polymerized before being applied onto the textile material. The possibility of polymerizing the branched chain perfluoroalkyl-vinyl or -allyl ethers with the aid of high energy ionizing irradiation after their application onto the textile material has also been mentioned.

However, all the finishes prepared by these known processes with polyfluoroalkyl compounds are not sufficiently resistant to mechanical stress, to dry cleaning and to washing. Therefore, attempts have been made to improve the resistance of such hydrophobic and oleophobic finishes on textile materials.

Now, we have found that excellent hydrophobic and oleophobic finishes on polyester fibrous materials and foils can be obtained by applying onto these materials fluoroalkyl-(meth)-acrylates, which are grafted and/or polymerized with the aid of tetrachloroethane and radical-forming catalysts. By this process, the polyester materials are provided with a finish which has an outstanding hydrophobic and oleophobic effect and which is resistant to mechanical stress and to cleaning processes.

The fluoroalkyl-(meth)-acrylates, preferably used in the process of the present invention are compounds of the general formula

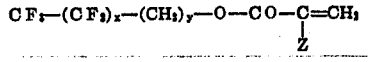

in which $x$ represents a number from 2 to 17, preferably from 5 to 9, and $y$ represents a number from 0 to 4, preferably 1 or 2, and Z stands for a hydrogen atom or the methyl group.

It has been found that, surprisingly, the use of tetrachloroethane as auxiliary agent promotes the grafting reaction in favorable sense.

In the process of the invention, the mixing proportion between acrylate and tetrachloroethane can vary within wide limits. It is suitable to maintain a mixing proportion of about 1:30 to about 15:1, preferably 1:5 to 5:1, parts by weight.

In order to obtain a sufficient hydrophobic and oleophobic effect of the finish, the fluoroalkyl-(meth)-acrylates have to be applied onto the substrate to be provided with a finish in quantities of at least 0.1 percent by weight, referred to the weight of the substrate. In general, quantities of about 0.5 to 10 percent by weight, referred to the weight of the goods, depending on the desired effect and on the goods to be provided with the finish will be applied. However, in special cases it is possible to use higher or smaller quantities.

For initiating the polymerization or grafting reaction, it is necessary that radical-forming catalysts are present, for example peroxides such as dibenzoyl-peroxide, di-tert.butyl-peroxide or acetyl peroxide, per-acids and the salts thereof, for example per-acetic acid, per-sulfates, per-borates, perbenzoates, hydrogen peroxide, esters of per-acids such as diisopropylene-per carbonate and azo compounds such as azo-di-isobutyronitrile.

The radical-forming catalysts may be applied to the substrate under certain circumstances together with the tetrachloroethane prior to the application of the monomer.

In order to accelerate and to initiate the grafting reaction, the goods treated with the mixture of the invention are subjected to a heat treatment. This treatment is carried out at temperatures in the range of from about 80° to about 220° C. Depending on the temperature used, the heat treatment may be carried out for 1 minute to about 2 hours. A two-step process has proved to be particularly favorable wherein the goods are first heated for up to about 120 minutes to temperatures in the range of from about 80° to about 140° C, preferably to 100° to 130° C, and then for up to about 120 minutes to temperatures in the range of from about 150° to 220° C, preferably to about 160° – 180° C. Care must be taken above all that the solution applied within the first step does not evaporate. Therefore, it is suitable to treat with heat the substrate, which has been previously treated with the solution of the invention, in a closed system, for example in wound-up or rolled-up state.

In order to shorten the heat treatment time it is also possible to apply the monomer solution, consisting of fluoroalkyl-(meth)-acrylate, tetrachloroethane and catalyst, in heated state, preferably at temperatures of 40° to 80° C, onto the substrate and then subjecting the substrate to a heat treatment, if possible in a closed system.

The process of the invention for producing a hydrophobic and oleophobic finish is particularly suited for the finishing of fibrous materials which consist of linear polyesters or contain such materials. These fibrous materials may be textile or technical fabrics, knitted or loop-woven fabrics or fiber fleeces. Furthermore, the process of the invention may also be applied to synthetic filaments, fibers or yarns before they are further treated. In such cases it is possible to omit a separate finishing process for the finished textile material.

The textiles provided with a finish according to the invention are particularly suited for rain-repellent clothing. Since the textile materials provided with such a finish maintain to a large extent their textile character, they may likewise be used for any kind of normal clothing textiles. Furthermore, the fibrous materials provided with a finish according to the invention may also be used for the manufacture of, for example tissues for tents, umbrellas or other industrial articles.

The following Examples show, on the basis of test results, the advantageous hydrophobic and oleophobic effects of the finishes prepared according to the invention. The values for the "water absorption", "water penetration" and "water-pearling-off effect" were determined according to the sprinkling test method devised by Bundesmann (according to DIN 53 888) (cf. K. Lindner: "Tenside - Hilfsmittel - Waschrohstoffe," Volume 2, 2nd Edition (1964), page 1880. The absorption of water is indicated as percentual weight increase of the fabric samples after centrifugation. The water penetration is the volume of water, measured in $cm^3$, which has run through the fabric during sprinkling. The pearling-off effect is evaluated visually on the basis of the pearling-off of the water from the fabric sample, the mark 5 designing a very good and the mark 1 a poor pearling-off effect.

The oleophobic properties of the samples provided with the finish were determined with the aid of the 3 M-test (cf. Textile Research Journal, Vol. 32 (1962), pages 320 – 331). In this test, the resistance of a fabric to wetting with oils is measured. Paraffin oils and mixtures of paraffin oil and n-heptane are used as test mixtures. The addition of n-heptane to the paraffin oil increases the wetting action. The test mixtures are applied in the form of an oil drop onto the fabric to be tested. The wetting resistance of the fabric to be tested is the higher the greater the proportion of n-heptane in the oil mixture is, which is just not yet wetting. The mixtures of paraffin oil and n-heptane give the following resistances to wetting which have been established for the 3 M-test:

| Paraffin oil (%) | n-Heptane (%) | Resistance to wetting |
|---|---|---|
| 100 | 0 | 50 |
| 90 | 10 | 60 |
| 40 | 60 | 100 |
| 30 | 70 | 110 |
| 0 | 100 | 150 |

The following Examples illustrate the invention:

EXAMPLE 1:

A 7.5 percent solution of 1,1-dihydroperfluoro-octyl acrylate in tetrachloroethane was prepared. After having introduced, with stirring, 5 percent tert.butyl-perbenzoate, referred to the fluorocompound used, a twill of polyethylene-glycol terephthalate (50 filaments in the warp, 40 filaments in the weft) was impregnated on a foulard with a slight squeezing pressure (squeezing effect 120 percent) with the above solution and then rolled up. The rolled-up material was packed tight to air in a closely fitting bag of polyester foil and treated for 2 hours in a hot air chamber at 160° C. The coating amounted to 1.2 percent. The fabric so provided with a finish was then subjected to different dry cleaning treatments with perchloroethylene.

Table 1 shows the hydrophobic and oleophobic effects after these different dry cleaning treatments.

Table 1

| Material | Hydrophobic effect | 3 M-Test |
|---|---|---|
| Not cleaned | good | 80 |
| Cleaned 1 × in perchloroethylene | good | 80 |
| Cleaned 5 × in perchloroethylene | good | 80 |
| Cleaned 10 × in perchloroethylene | good | 80 |

Table 1-Continued

| Material | Hydrophobic effect | 3 M-Test |
|---|---|---|
| Cleaned 15 × in perchloroethylene | good | 70 |

EXAMPLE 2:

A 10 percent solution of 1,1,2,2,-tetrahydro-perfluorodecane acrylate in tetrachloroethane was combined with 5 percent of tert.butyl-peroxide. A toile fabric of polyethylene glycol terephthalate endless filaments (50/50 filaments in warp/weft) was washed in a machine at 60° C, dried and impregnated on a foulard with the above solution with a low squeezing pressure (squeezing effect 120 percent). The fabric treated in this manner was rolled up and packed in an air-tight closed, closely fitting bag of polyester foil. This bag was placed in a hot air chamber for 15 minutes at a temperature of 125° C. The fabric was then subjected to dry cleaning with perchloroethane. The coating was then 1.4 percent. The 3 M-test gave a value of 100.

Hydrophobic effect according to the test method devised by Bundesmann (DIN 53 888, German Industrial Standard):

Take-up of water: 1.5 %
Penetration: 30 cc.
Pearling-off effect: 3 – 4

EXAMPLE 3:

5 percent of tert. butyl-perooxide, referred to the fluoro-compound used, were added to a 5 percent solution of 1,1-dihydroperfluorooctyl-acrylate in tetrachloroethane and then a fabric as that described in Example 2 was treated as described therein.

Test results:
Coating: 1 %
3–M Test: 110
Water-repelling effect according to Bundesmann:
Water absorption: 1 %
Penetration: 20 cc.
Pearling-off effect 4 – 5

EXAMPLE 4:

5 percent of tert.butyl-peroxide were added to a 5 percent solution of 1,1,2,2-tetrahydro-perfluorodecane-acrylate in tertrachloroethane, referred to the fluorine compound used. A polyethyleneglycol terephthalate knit fabric was impregnated on a foulard with a light squeezing pressure (squeezing effect 125 percent) and treated in rolled-up state in a hot air chamber at 100° C. The material was then transferred to an oven having 140° C and left there for 60 minutes. The fabric was subjected to a washing treatment on a full width washing machine. Coating: 1 percent.

The following Table 2 shows the hydrophobic and oleophobic effects after the different washing treatments:

Table 2

| Washings | Hydrophobic effect | 3-M-Test |
|---|---|---|
| Not washed | good | 80 |
| Washed 1 × with a commercial detergent used for washing machines | good | 80 |
| Washed 5 × with a commercial detergent used for washing machines | good | 70 |

We claim:

1. A process for rendering polyester materials for fibers and foils water- and oil repellant which comprises contacting said material with a mixture of a fluoroalkyl acrylate or methacrylate and tetrachloroethane and effecting a graft polymerization or polymerization or both of these reactions by addition of an effective amount of a free radical generating catalyst, wherein said fluoroalkyl acrylate or methacrylate has the formula

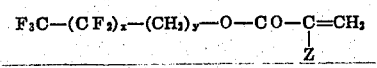

in which x is a number of 2 to 17, y is a number of zero to 4 and Z is hydrogen or methyl and wherein from 0.1% to 10% referred to the weight of the polyester of said fluoroalkyl compound are added onto the polyester material.

2. A process as claimed in claim 1, wherein the polyester material consists essentially of poly-ethyleneglycolterephthalate.

3. A process as claimed in claim 1, wherein the fluoroalkyl acrylate or methacrylate has the formula

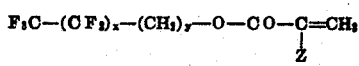

in which $x$ is a number of 2 to 17, $y$ is a number of zero to 4 and Z is hydrogen or methyl.

4. A process as claimed in claim 1, wherein $x$ is a number of 5 to 9 and $y$ is 1 or 2.

5. A process as claimed in claim 1, wherein the ratio of fluoroalkyl compound and tetrachloroethane is about 1:30 to about 15:1 parts by weight.

6. A process as claimed in claim 5, wherein the ratio is about 1:5 to about 5:1.

7. A process as claimed in claim 1, wherein the catalyst is a peroxide.

8. A process as claimed in claim 7, wherein the peroxide is an organic peroxide.

9. A process as claimed in claim 8, wherein the peroxide is dibenzoyl peroxide, di-tertiary-butyl peroxide, di-acetyl peroxide, peracetic acid and its salts, perbenzoic acid and its salts, or azo-diisobutyronitrile.

10. A process as claimed in claim 7, wherein the peroxide is an inorganic peroxide.

11. A process as claimed in claim 10, wherein the peroxide is hydrogen peroxide, persulfuric acid and its salts, perboric acid and its salts or a lower aliphatic ester of percarbonic acid.

12. A process as claimed in claim 1, wherein the catalyst is contacted with the polyester material before contacting the material with the fluoroalkyl compound.

13. A process as claimed in claim 1, wherein the tetrachloroethane is contacted with the polyester material before the material is contacted with the fluoroalkyl compound.

14. A process as claimed in claim 1, wherein a mixture of fluoroalkyl compound, tetrachloroethane and catalyst having a temperature of about 40° to 80° C is added to the polyester material.

15. A process as claimed in claim 1, wherein the polyester material is conducted continuously through a mixture of the fluoroalkyl compound, tetrachloroethane and the catalyst which mixture has a temperature of about 40° to 80°C.

16. A process as claimed in claim 1, wherein the amount is about 0.2 to about 2 percent.

17. A process as claimed in claim 1, wherein the polyester which has been treated with the fluoroalkyl compound, tetrachloroethane and the catalyst is heated to a temperature of about 80° to about 220°C.

18. A process as claimed in claim 1, wherein the polyester is impregnated with the mixture of fluoroalkyl compound, tetrachloroethane and catalyst and cured in a two-step heat treatment consisting of a first step of a temperature of about 80° to 140°C and a second step of a temperature of about 150° to 220°C.

19. A process as claimed in claim 18, wherein the temperature is in the first step between 100° and 130°C and in the second step between 160° and 180°C.

* * * * *